United States Patent
Hatanaka et al.

(10) Patent No.: US 10,320,211 B2
(45) Date of Patent: Jun. 11, 2019

(54) HEARING AID AND HEARING-AID CHARGING SYSTEM

(71) Applicant: NITTO DENKO CORPORATION, Ibaraki-shi, Osaka (JP)

(72) Inventors: Takezo Hatanaka, Ibaraki (JP); Hisashi Tsuda, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

(21) Appl. No.: 15/027,078

(22) PCT Filed: Sep. 29, 2014

(86) PCT No.: PCT/JP2014/075812
§ 371 (c)(1),
(2) Date: Apr. 4, 2016

(87) PCT Pub. No.: WO2015/050073
PCT Pub. Date: Apr. 9, 2015

(65) Prior Publication Data
US 2016/0241063 A1    Aug. 18, 2016

(30) Foreign Application Priority Data

Oct. 2, 2013   (JP) .................................. 2013-206984

(51) Int. Cl.
*H04R 25/00* (2006.01)
*H02J 7/00* (2006.01)
(Continued)

(52) U.S. Cl.
CPC ............ *H02J 7/0044* (2013.01); *H02J 7/025* (2013.01); *H02J 50/12* (2016.02); *H04R 25/556* (2013.01);
(Continued)

(58) Field of Classification Search
CPC .. H04R 2225/31; H04R 2225/33; H02J 50/12
See application file for complete search history.

(56) References Cited

U.S. PATENT DOCUMENTS 5,253,300 A    10/1993  Knapp
6,157,252 A *  12/2000  Compton ................ H01L 29/94
                                                           257/E29.345
(Continued)

FOREIGN PATENT DOCUMENTS

CN    102239633 A    11/2011
EP       2876777 A1   5/2015
(Continued)

OTHER PUBLICATIONS

Apr. 12, 2017 Search Report issued in European Patent Application No. 14850348.5.
(Continued)

*Primary Examiner* — Brian Ensey
*Assistant Examiner* — Ryan Robinson
(74) *Attorney, Agent, or Firm* — Oliff PLC

(57) ABSTRACT

In regard to a hearing aid and a hearing aid charging system, frequent replacement of a battery is avoided even if power consumption is large, and the structure is simplified and waterproofness is improved. A Hearing aid includes a secondary battery having a nominal voltage higher than a nominal voltage of an air battery, a driving component driven by power supplied from the secondary battery, and a transformation unit configured to output the charging power of the secondary battery at a voltage suitable for driving the driving component.

9 Claims, 10 Drawing Sheets

(51) Int. Cl.
*H02J 50/12* (2016.01)
*H02J 7/02* (2016.01)

(52) U.S. Cl.
CPC .......... *H04R 25/65* (2013.01); *H04R 2225/31* (2013.01); *H04R 2225/33* (2013.01)

(56) References Cited

U.S. PATENT DOCUMENTS

| | | | |
|---|---|---|---|
| 6,265,100 B1* | 7/2001 | Saaski | H01M 10/0431 429/161 |
| 6,304,467 B1* | 10/2001 | Nebrigic | H02J 7/0065 363/49 |
| 6,310,960 B1 | 10/2001 | Saaski et al. | |
| 6,471,715 B1* | 10/2002 | Weiss | A61B 17/04 606/216 |
| 6,473,511 B1* | 10/2002 | Aceti | A61B 5/6817 381/322 |
| 6,648,813 B2* | 11/2003 | Zilberman | H04R 25/606 600/25 |
| 6,658,124 B1* | 12/2003 | Meadows | H04R 25/55 381/323 |
| 6,741,715 B2* | 5/2004 | Andersen | H04R 25/505 381/312 |
| 7,324,652 B2* | 1/2008 | Preves | H01M 10/0413 381/323 |
| 7,349,741 B2* | 3/2008 | Maltan | A61N 1/36036 381/312 |
| 8,344,689 B2* | 1/2013 | Boguslavskij | H04R 25/554 320/108 |
| 8,914,127 B1* | 12/2014 | Yan | A61N 1/36032 600/379 |
| 2003/0142843 A1 | 7/2003 | Meier | |
| 2006/0067544 A1* | 3/2006 | Moraghan | H04R 25/502 381/113 |
| 2008/0089541 A1 | 4/2008 | Preves et al. | |
| 2009/0001932 A1 | 1/2009 | Kamijo et al. | |
| 2009/0257610 A1* | 10/2009 | Wu | H04R 25/00 381/323 |
| 2011/0080052 A1 | 4/2011 | Sato | |
| 2012/0256494 A1 | 10/2012 | Kesler et al. | |
| 2014/0176060 A1* | 6/2014 | Vorperian | H04R 25/55 320/108 |
| 2014/0233776 A1* | 8/2014 | Krogsgaard | H04R 1/1025 381/323 |
| 2014/0354225 A1 | 12/2014 | Kitamura | |

FOREIGN PATENT DOCUMENTS

| | | |
|---|---|---|
| JP | 2002-506335 A | 2/2002 |
| JP | 2007-244046 A | 9/2007 |
| JP | 2008-278329 A | 11/2008 |
| JP | 2009-011129 A | 1/2009 |
| JP | 2009-021910 A | 1/2009 |
| JP | 2010-034949 A | 2/2010 |
| JP | 2011-083078 A | 4/2011 |
| JP | 2012-191448 A | 10/2012 |
| JP | 2012-191546 | 10/2012 |
| WO | 2010036980 A1 | 4/2010 |
| WO | 2013/080467 A1 | 6/2013 |

OTHER PUBLICATIONS

Aug. 26, 2016 Office Action issued in Taiwanese Patent Application No. 103134288.
Nov. 4, 2014 Search Report issued in International Patent Application No. PCT/JP2014/075812.
Nov. 4, 2014 Written Opinion issued in International Patent Application No. PCT/JP2014/075812.
Jul. 18, 2017 Office Action issued in Japanese Patent Application No. 2013-206984.
Aug. 2, 2018 Office Action issued in European Patent Application No. 14850348.5.
Jan. 19, 2018 Office Action issued in European Patent Application No. 14850348.5.
Apr. 14, 2016 Office Action issued in Taiwanese Patent Application No. 103134288.
Oct. 24, 2017 Office Action issued in Japanese Patent Application No. 2013-206984.
Feb. 13, 2018 Office Action issued in Chinese Patent Application No. 201480054798.6.
Jul. 11, 2016 Office Action issued in Singaporean Patent Application No. 11201602603S.
Oct. 31, 2018 Office Action issued in Chinese Patent Application No. 201480054798.6.
Jan. 29, 2019 Office Action issued in Chinese Patent Application No. 201480054798.6.

* cited by examiner

HEARING AID AND HEARING-AID CHARGING SYSTEM

TECHNICAL FIELD

The present invention relates to a hearing aid driven with power of a secondary battery and a hearing aid charging system.

BACKGROUND

A hearing aid typically include a high-energy-density air battery as a power source, in order to realize reduction in size and weight. For this reason, a known hearing aid includes a structure of taking in outside air, and are formed of a driving component driven at 1.2V which is the output voltage of the air battery (see PTL 1 and PTL 2).

CITATION LIST

Patent Literatures

[PTL 1] Japanese Unexamined Patent Publication No. 2012-191546
[PTL 2] Published Japanese translation of PCT application No. 2002-506335

SUMMARY OF INVENTION

Technical Problem

However, when the power consumption is increased in the known hearing aid due to functional advancement, the power of the air battery is consumed in a short time, with the result that the drained air battery must be frequently replaced with a fully-charged air battery. Furthermore, because the known hearing aid requires a structure to take in air in order to continue the discharging of the air battery, the structure of the hearing aid tends to be disadvantageously complicated, and the waterproofness is lost.

An object of the present invention is to provide a hearing aid and a hearing aid charging system, which do not require frequent replacement of a battery even if power consumption is large, are simple in structure, and have improved waterproofness.

Solution to Problem

The present invention relates to a hearing aid including: a secondary battery having a nominal voltage higher than a nominal voltage of an air battery; at least one driving component driven by power supplied from the secondary battery; a charging unit configured to supply DC power at a predetermined voltage to the secondary battery; and a transformation unit configured to output the charging power of the secondary battery to the at least one driving component, at a voltage suitable for driving the at least one driving component.

According to the arrangement above, even if the secondary battery outputs the charging power with the nominal voltage higher than the nominal voltage of the air battery, the transformation unit outputs the charging power of the secondary battery at a voltage suitable for driving the driving component. On this account, the driving component is stably driven with the charging power of the secondary battery in the same manner as in cases where the driving component is driven by the air battery. With this, obtained performances are on the same level as in a hearing aid employing an air battery, and frequent replacement of the secondary battery is avoided because the hearing aid is repeatedly usable by recharging, even if the secondary battery is drained in a short time due to the increased power consumption of the hearing aid. Furthermore, a structure or the like for taking in air as in the air battery is unnecessary, with the result that the structure of the hearing aid is simplified and the waterproofness of the hearing aid is improved.

The hearing aid of the present invention may be arranged such that the secondary battery is a lithium ion battery.

According to this arrangement, the nominal voltage of the lithium ion battery falls within the range of 3.6V to 3.7V and is higher than the nominal voltage of the air battery. Because the energy density of the lithium ion battery is high, the hearing aid can be driven for a long time as compared to cases where the air battery or the nickel-hydrogen secondary battery is employed.

The hearing aid of the present invention may be arranged such that the at least one driving component includes plural driving components, two or more of the driving components are driven by power at the same voltage, and the transformation unit outputs the power at a voltage suitable for each of the driving components driven at the same voltage to each of the driving components driven at the same voltage.

Because in this arrangement the driving components driven at the same voltage are employable, the degree of freedom in the choice and arrangement of the driving components is improved. The cost reduction for the hearing aid is therefore further achieved.

The hearing aid of the present invention may be arranged such that the at least one driving component includes plural driving components, two or more of the driving components are driven by power at different voltages, and the transformation unit outputs the power at a voltage suitable for each of the driving components driven at different voltages to each of the driving components driven at different voltages.

According to this arrangement, plural driving components driven at different voltages are employable. It is therefore possible to improve the degree of freedom in the choice of the driving components. The cost reduction for the hearing aid is therefore further achieved.

The hearing aid of the present invention may be arranged such that the transformation unit includes at least one of a voltage boosting circuit configured to increase a voltage to be higher than a terminal voltage of the secondary battery and a voltage dropping circuit configured to decrease a voltage to be lower than the terminal voltage of the secondary battery.

According to this arrangement, because a driving component driven at a voltage higher or lower than the terminal voltage of the secondary battery can be employed, more options are available for the driving components. The cost reduction for the hearing aid is therefore further achieved.

The hearing aid of the present invention may be arranged such that at least one of the driving components is a dedicated member which is driven at a voltage falling in a range between a charging stop voltage and a discharging stop voltage of the secondary battery.

According to this arrangement, because the dedicated member is directly driven at the voltage falling within the range between the charging stop voltage and the discharging stop voltage of the secondary battery, power loss at the voltage boosting or voltage dropping in the transformation unit is reduced.

The hearing aid of the present invention may be arranged such that at least one of the driving components is a dedicated member driven at the nominal voltage of the secondary battery.

According to this arrangement, because the dedicated member is directly driven at the nominal voltage of the secondary battery, power loss at the voltage boosting or voltage dropping in the transformation unit is reduced.

The hearing aid of the present invention may further include: a power-receiving module configured to receive power from the outside in a contactless manner; and a rectifier configured to output DC power to the charging unit by rectifying AC power supplied to the power-receiving module.

According to the arrangement above, because the power is supplied to the power-receiving module in a contactless manner, the degree of freedom in the arrangement of the power-receiving module is improved and the waterproofness is improved as compared to contact-type power supply by using wires such as a cable or by causing terminals to make contact with each other. Furthermore, because the transformation unit outputs the charging power of the secondary battery to the driving component at a voltage suitable for driving the driving component, it is possible to employ components which are driven at various voltages as a driving component of the hearing aid. On this account, components are selectable from various mass-produced driving components which are widely available, and hence the cost for producing the hearing aid is reduced. Furthermore, even if the terminal voltage of the secondary battery varies in accordance with power supply, the transformation unit maintains the voltage at which the power is supplied to each driving component to be constant, with the result that each driving component is stably driven over a long period of time.

The hearing aid of the present invention may further include: a power-receiving module configured to receive power from the outside in a contactless manner by resonance phenomenon; and a rectifier configured to output DC power to the charging unit by rectifying the AC power supplied to the power-receiving module, at least one of the rectifier, the charging unit, the transformation unit, and the secondary battery being provided in a magnetic field space which is formed by the resonance phenomenon to have a lower magnetic field strength than those in other parts.

According to the arrangement above, because the power supply to the power-receiving module is performed by the resonance phenomenon, long-distance power transmission is possible as compared to power supply by the electromagnetic induction, with the result that the degree of freedom in the arrangement of the power-receiving module is increased. Furthermore, because the transformation unit outputs the charging power of the secondary battery to the driving component at a voltage suitable for driving the driving component, it is possible to employ components which are driven at various voltages as a driving component of the hearing aid. On this account, driving components are selectable from various mass-produced driving components which are widely available, and hence the cost for producing the hearing aid is reduced. Furthermore, even if the terminal voltage of the secondary battery varies in accordance with power supply, the transformation unit maintains the voltage at which the power is supplied to each driving component to be constant, with the result that each driving component is stably driven over a long period of time.

Furthermore, according to the arrangement above, a space part having a small magnetic field is generated in the vicinity of the power-receiving module to which power is supplied by resonance phenomenon, and this space part is effectively utilized as an arrangement place for electronic circuit components such as the rectifier. It is therefore possible to secure the arrangement place for electronic circuit components even in the hearing aid in which it is typically difficult to secure the arrangement place, and eventually to realize the downsizing of the hearing aid.

The present invention relates to a hearing aid charging system including: the hearing aid having one of the arrangements above; and a charging device configured to charge the secondary battery of the hearing aid, the charging device including: a supporting stand configured to detachably support the hearing aid in a predetermined power supplying posture; and a power-supplying module configured to supply power in a contactless manner to the power-receiving module of the hearing aid supported by the supporting stand.

According to the arrangement above, as the distance and the positional relation between the power-receiving module of the hearing aid supported by the supporting stand and the power-supplying module of the charging device are maintained to be constant, charging at a voltage suitable for the charging characteristic of the secondary battery is possible.

The hearing aid charging system of the present invention may be arranged such that the charging device includes: a hearing aid detector configured to detect the hearing aid supported by the supporting stand; and a power-supplying module controller configured to drive the power-supplying module only when the hearing aid is detected by the hearing aid detector.

According to the arrangement above, charging at a voltage suitable for the charging characteristic of the secondary battery is possible.

The hearing aid charging system of the present invention may be arranged such that the charging device further includes a cover member capable of covering an exposed part of the hearing aid supported by the supporting stand, the cover member is provided with the power-supplying module, and the power-supplying module is disposed to oppose the power-receiving module of the hearing aid when the exposed part of the hearing aid is covered by the cover member.

With this arrangement, charging is performed only when the hearing aid is covered by the cover member. On this account, whether the charging is in progress or is stopped can be confirmed by checking whether the hearing aid is covered by the cover member. In other words, whether the charging is in progress or is stopped is easily discerned.

Advantageous Effects of Invention

According to the present invention, frequent replacement of a battery is avoided even if power consumption is large, and the structure is simplified and waterproofness is improved.

DESCRIPTION OF EMBODIMENTS (Hearing Aid 6: Overall Structure)

Figure 1:
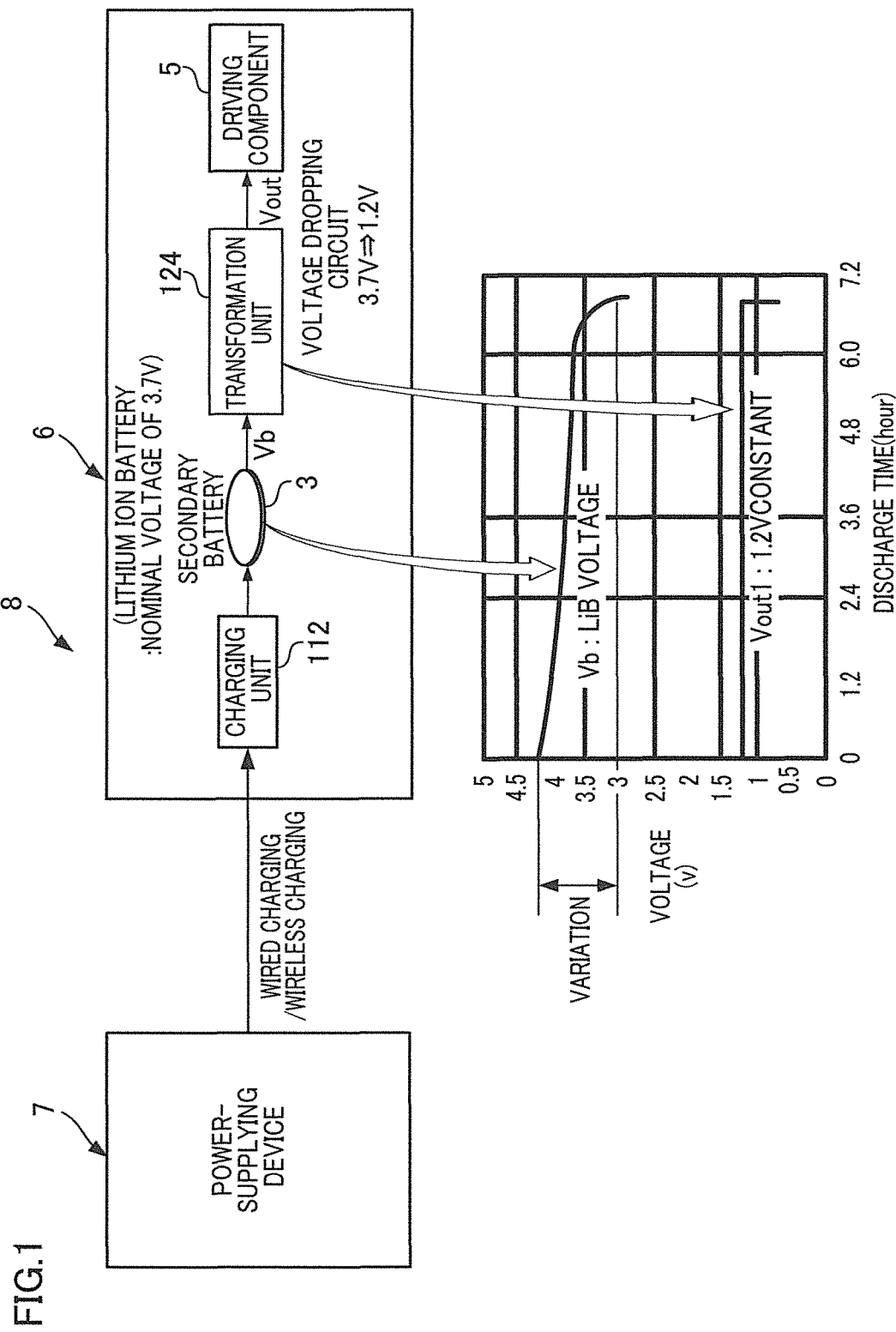
FIG. 1 illustrates a hearing aid charging system.

As shown in FIG. 1, a hearing aid of the present embodiment include: a secondary battery 3 having a nominal voltage higher than the nominal voltage of an air battery; a driving component driven by power supplied from the secondary battery 3; a charging unit 112 supplying DC power at a predetermined voltage to the secondary battery 3; and a transformation unit 124 configured to output the charging power of the secondary battery 3 at a voltage suitable for driving the driving component 5.

In regard to the above, "nominal voltage" is a value set as a standard for a voltage between terminals obtained when a battery is in normal use. While the terminal voltage higher than the nominal voltage is obtained when the battery is almost fully charged, the terminal voltage is lower than the nominal voltage when discharging is advanced or a large current is supplied to a load. The nominal voltage of the air battery falls within the range of 1.2V to 1.4V. The nominal voltage of a nickel-hydrogen secondary battery falls within the range of 1.2V to 1.4V in the same manner as in the air battery.

In the meanwhile, when the secondary battery 3 is, for example, a lithium ion battery (LiB), the nominal voltage falls within the range of 3.6V to 3.7V. In the lithium ion battery, the range between a discharging stop voltage and a charging stop voltage is 2.7V to 4.2V. The discharging stop voltage is the minimum discharging voltage with which discharge is safely done, whereas the charging stop voltage is the maximum charging voltage with which charging is safely done.

According to the arrangement above, even if the secondary battery 3 outputs the charging power with the nominal voltage higher than the nominal voltage of the air battery or varies the battery voltage over the discharge time, the transformation unit 124 outputs the charging power of the secondary battery 3 at a voltage suitable for driving the driving component 5. On this account, the driving component 5 is stably driven with the charging power of the secondary battery 3 in the same manner as in cases where each driving component 5 is driven by the air battery. With this, obtained performances are on the same level as in a hearing aid 6 employing an air battery, and frequent replacement of the secondary battery 3 is avoided because the hearing aid 6 is repeatedly usable by recharging, even if the secondary battery 3 is drained in a short time due to the increased power consumption of the hearing aid 6. Furthermore, a structure or the like for taking in air as in the air battery is unnecessary, with the result that the structure of the hearing aid 6 is simplified and the waterproofness of the hearing aid 6 is improved.

In the hearing aid 6, power for recharging of the secondary battery 3 is supplied from the charging device 7. A method of supplying power from the charging device 7 to the hearing aid 6 may be a contact power supply method or a contactless power supply method. Examples of the contact power supply method include a method of supplying power by connecting the charging device 7 with the hearing aid 6 by a power line and a method of supplying power by causing a terminal of the charging device 7 to be in contact with a terminal of the hearing aid 6. In the contact power supply method, the charging device 7 may output AC power or DC power. In case of supplying AC power, the charging unit 112 of the hearing aid 6 has a rectification function.

Figure 2:
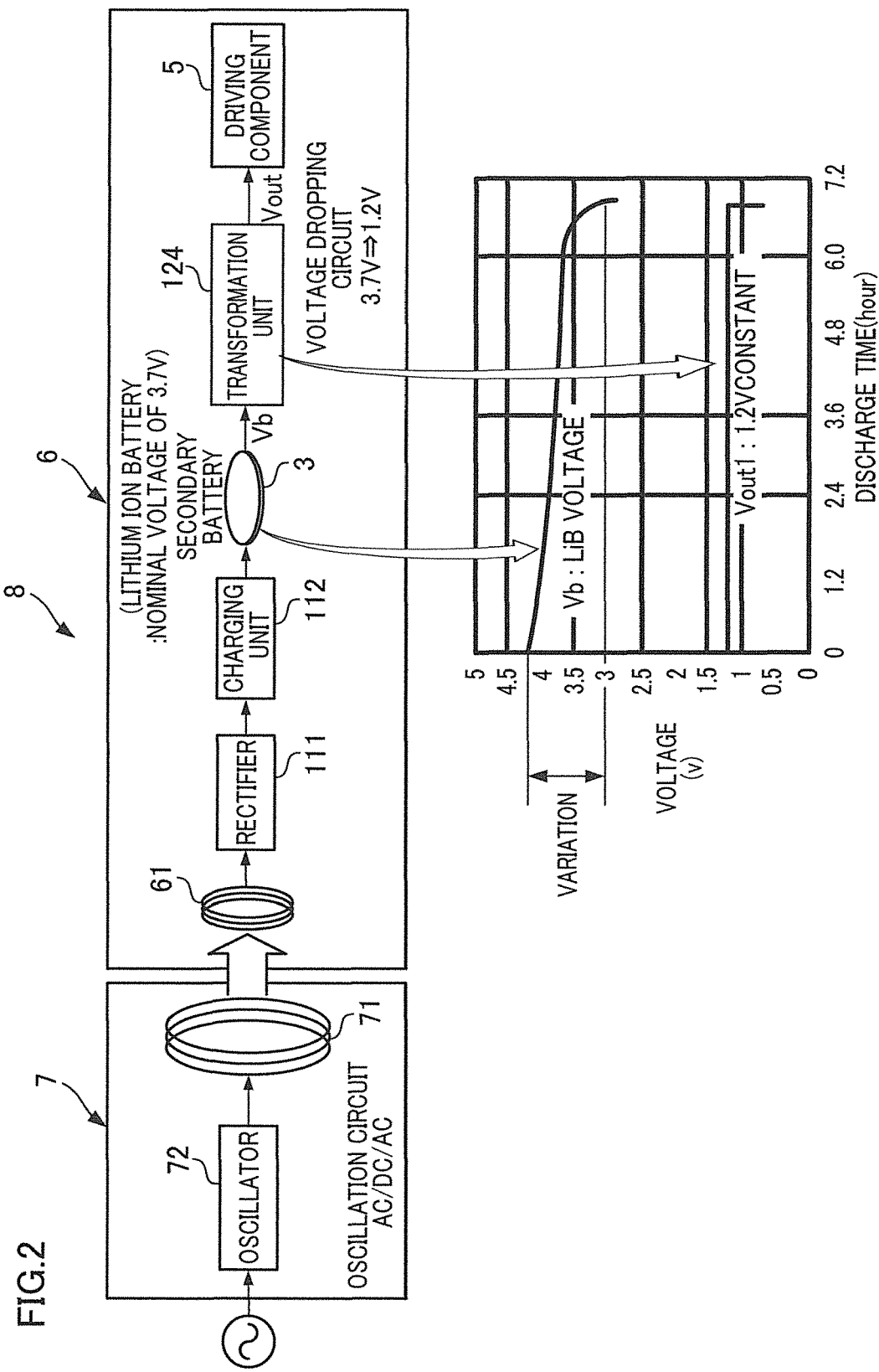
FIG. 2 illustrates the hearing aid charging system.
Figure 3:
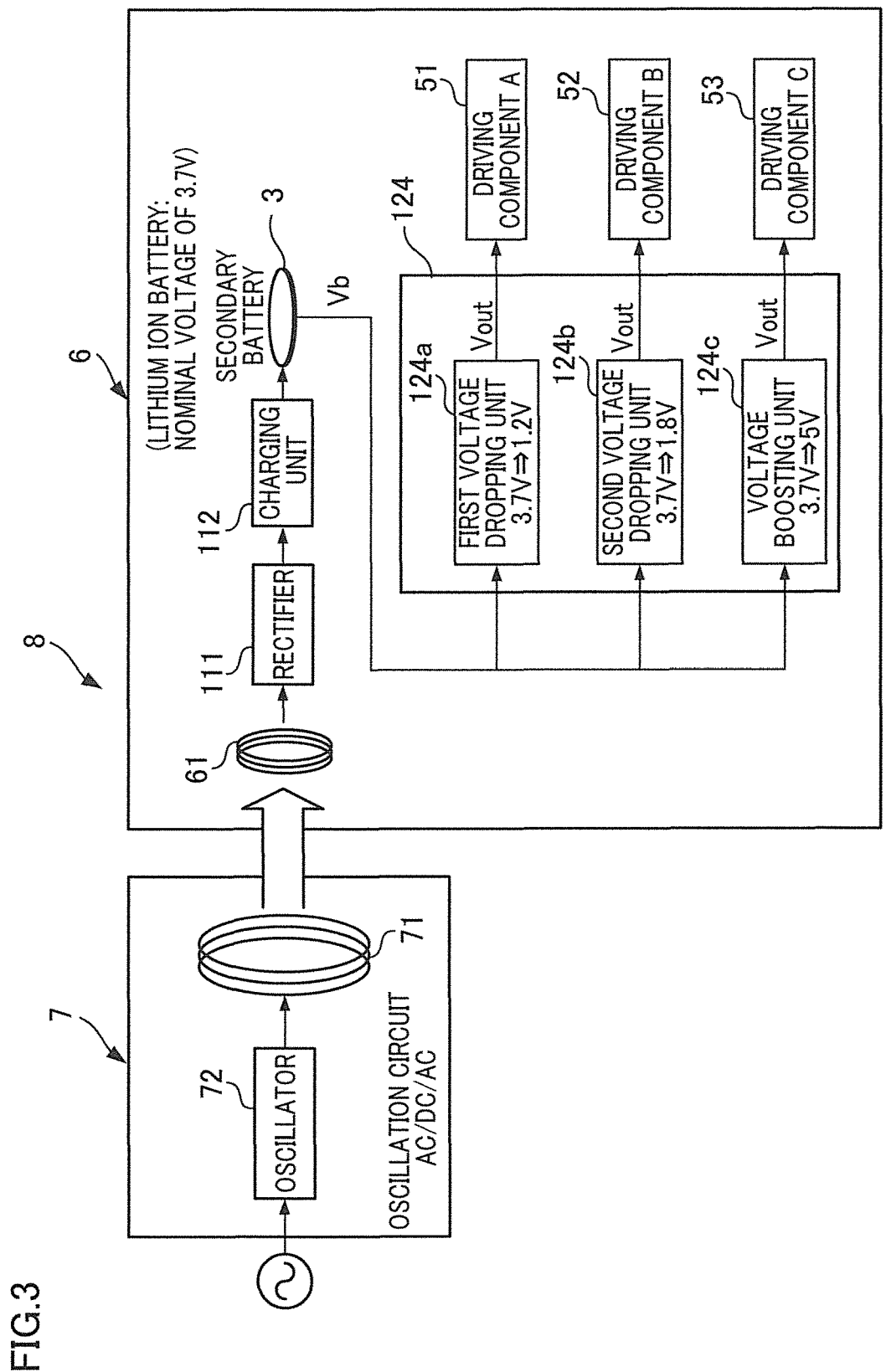
FIG. 3 illustrates the hearing aid charging system.
Figure 4:
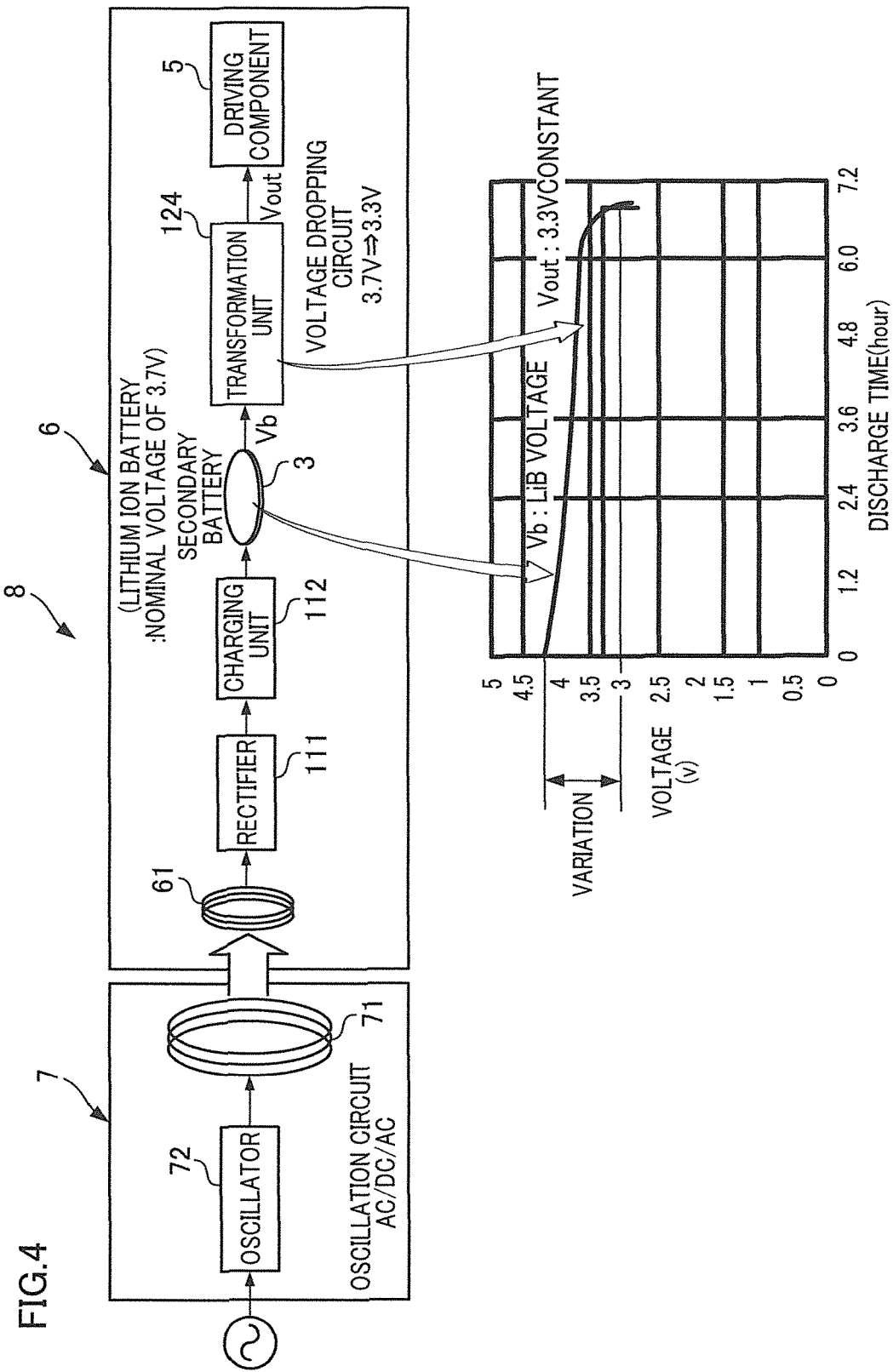
FIG. 4 illustrates the hearing aid charging system.

Examples of the contactless power supply method include electromagnetic induction and magnetic field resonance. A hearing aid 6 to which power is supplied by magnetic field resonance will be detailed. As shown in FIG. 2 to FIG. 4, the hearing aid 6 includes: a secondary battery 3 having a nominal voltage higher than that of the air battery; a driving component 5 driven by power supplied from the secondary battery 3; a power-receiving module 61 receiving power from the outside (a power-supplying module 71 of a charging device 7) by resonance phenomenon; a rectifier 111 outputting DC power by rectifying AC power supplied to the power-receiving module 61; a charging unit 112 supplying, at a predetermined voltage, the DC power output from the rectifier 111 to the secondary battery 3; and a transformation unit 124 outputting the charging power of the secondary battery 3 to the driving component 5 at a voltage suitable for driving the driving component 5.

With this, because the power supply to the power-receiving module 61 is performed by the resonance phenomenon, long-distance power transmission is possible in the hearing aid 6 as compared to power supply by the electromagnetic induction, with the result that the degree of freedom in the arrangement of the power-receiving module 61 is increased. Furthermore, because the transformation unit 124 outputs the charging power of the secondary battery 3 to the driving component 5 at a voltage suitable for driving the driving component 5, it is possible to employ components which are driven at various voltages as a driving component 5 of the hearing aid 6. On this account, the driving component 5 is selectable from various mass-produced driving components which are widely available, and hence the cost for producing the hearing aid 6 is reduced. Furthermore, even if the terminal voltage of the secondary battery 34 varies in accordance with power supply to the driving component 5, the transformation unit 124 maintains the voltage at which the power is supplied to the driving component 5 to be constant, with the result that the driving component 5 is stably driven over a long period of time.

(Hearing Aid 6: Secondary Battery 3)

As the secondary battery 3 of the hearing aid 6, any types of battery can be employed as long as the nominal voltage thereof is higher than the nominal voltage of the air battery. Examples of such a battery employable as the secondary battery 3 include a lead storage battery, a valve-regulated lead storage battery, a lithium air battery, a lithium ion battery, a lithium polymer battery, a manganese dioxide lithium secondary battery, and a titanium carbon lithium secondary battery. The nominal voltage of each of the lithium ion battery and the lithium polymer battery falls within the range of 3.6V to 3.7V. The nominal voltage of the manganese dioxide lithium secondary battery is 3.0V. The nominal voltage of the titanium carbon lithium secondary battery is 1.5V.

The secondary battery 3 is preferably a lithium ion battery. Because in this case the nominal voltage of the lithium ion battery falls within the range of 3.6V to 3.7V, this nominal voltage is higher than the nominal voltage of the air battery or the nickel-hydrogen secondary battery, which falls within the range of 1.2V to 1.4V. Furthermore, even if the lithium ion battery exhibits a discharge characteristic such that the battery voltage is lowered from about 4.2V to about 2.7V in accordance with the discharging, the hearing aid 6 is driven for a long time as compared to cases where the air battery or the nickel-hydrogen secondary battery is employed, because the energy density of the lithium ion battery is higher than those of the air battery and the nickel-hydrogen secondary battery.

(Hearing Aid 6: Driving Component 5)

Figure 5:
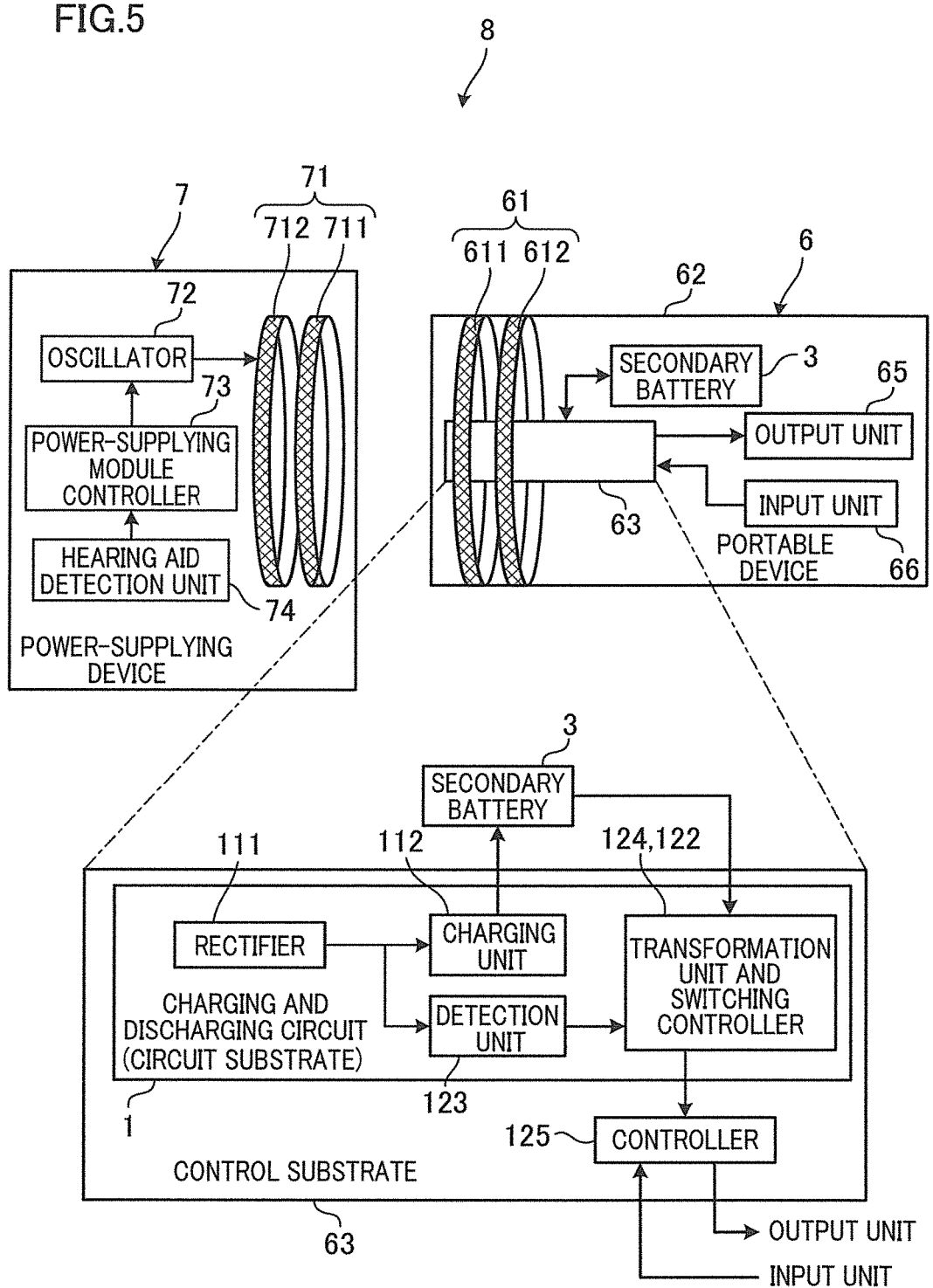
FIG. 5 is a block diagram of the hearing aid charging system.

The driving component 5 encompasses all types of components of hearing aid driven by electric power, such as a microphone, a speaker, a light emitter, and a display. To be more specific, as shown in FIG. 5, the driving component 5 includes output units 65 such as a speaker, a light emitter, and a display and input units 66 such as a microphone and a switch. The driving component 5 including the output units 65 and the input units 66 is driven at a voltage of about 1.2V which is a discharging voltage of the air battery. On this account, the driving component 5 receives power which is dropped by a voltage dropping circuit of the transformation unit 124 to 1.2V from 3.7V which is the nominal voltage of the lithium ion battery.

The hearing aid 6 includes plural driving components 5. Two or more of these driving components 5 are driven by power at the same voltage, and the transformation unit 124 may output power to each of these driving components 5 driven at the same voltage, at a voltage suitable for driving each driving component 5. Because in this case the driving components 5 driven at the same voltage are employable, the degree of freedom in the choice and arrangement of the driving components 5 is improved.

In addition to the above, the hearing aid 6 may include plural driving components 5, two of these driving components 5 may be driven by power at different voltages, and the transformation unit 124 may output power to each of these driving components 5 driven at different voltages, at a voltage suitable for driving each driving component 5. To be more specific, for example, as shown in FIG. 3, when the operating voltage of a driving component A51 is 1.2V, the operating voltage of a driving component B52 is 1.8V, and the operating voltage of a driving component C53 is 5V, the transformation unit 124 is formed of a first voltage dropping unit 124a, a second voltage dropping unit 124b, and a voltage boosting unit 124c, and 1.2V power is supplied from the first voltage dropping unit 124a to the driving component A51, 1.8V power is supplied from the second voltage dropping unit 124b to the driving component B52, and 5V power is supplied from the voltage boosting unit 124c to the driving component B52. According to this arrangement, plural driving components A51 to C53 driven at different voltages are employable. It is therefore possible to improve the degree of freedom in the choice of the driving components A51 to C53. With this, the cost reduction for the hearing aid 6 is further achieved.

Examples of the driving component A51 having the operating voltage of 1.2V include a DSP (Digital Signal Processor) component and a microphone. Examples of the driving component B52 having the operating voltage of 1.8V include an audio codec component. Examples of the driving component C53 having the operating voltage of 5V include a wireless communication interface component.

In addition to the above, the hearing aid 6 may include at least one dedicated member which is driven at the nominal voltage of the secondary battery 3. To be more specific, in the hearing aid 6, at least one of the driving components A51 to C53 may be formed of a dedicated member for the lithium ion battery, which is driven at the nominal voltage. In other words, the dedicated member is a driving component driven at a voltage about 3.6V to 3.7V which is equivalent to the nominal voltage of the lithium ion battery. In this case, as shown in FIG. 4, power loss at the voltage boosting or voltage dropping in the transformation unit 124 is reduced.

The dedicated member 54 may be driven at a voltage falling within the range from the charging stop voltage to the discharging stop voltage of the secondary battery 3 such as the lithium ion battery. While power is supplied to the driving components 5 via the transformation unit 124 in the present embodiment, the transformation unit 124 may not be provided when all of the driving components 5 are dedicated members 54, because it is possible to directly drive the driving components 5 (dedicated members 54) by the terminal voltage of the lithium ion battery. In other words, the secondary battery 3 may be directly connected with the driving component 5.

(Hearing Aid 6: Power-Receiving Module 61)

As shown in FIG. 5, the power-receiving module 61 to which power is supplied from the outside by the resonance phenomenon includes a power-receiving resonance coil 611 and a power-taking coil 612, each of which is made of a copper wire material coated by an insulation film. Examples of the types of coils used as the power-receiving resonance coil 611 and the power-taking coil 612 include a spiral type, a solenoid type, and a loop type. The resonance phenomenon indicates that two or more coils are resonated at a resonance frequency. The power supply by the resonance phenomenon is equivalent to power supply by magnetic field resonance and power supply by electromagnetic induction. With this method, power supply efficiency is improved in such a way that a current with a specific frequency is supplied to generate a magnetic field change in that cycle, and resonance coils are resonated. Because in the magnetic field resonance the distance between the resonance coils are more or less identical with the wavelength of the cycle due to the magnetic field change, long-distance power transmission is possible as compared to the generation of induced electromotive force by an electromagnetic wave based on the electromagnetic induction.

(Hearing Aid 6: Rectifier 111, Charging Unit 112, and Transformation Unit 124)

Figure 7:
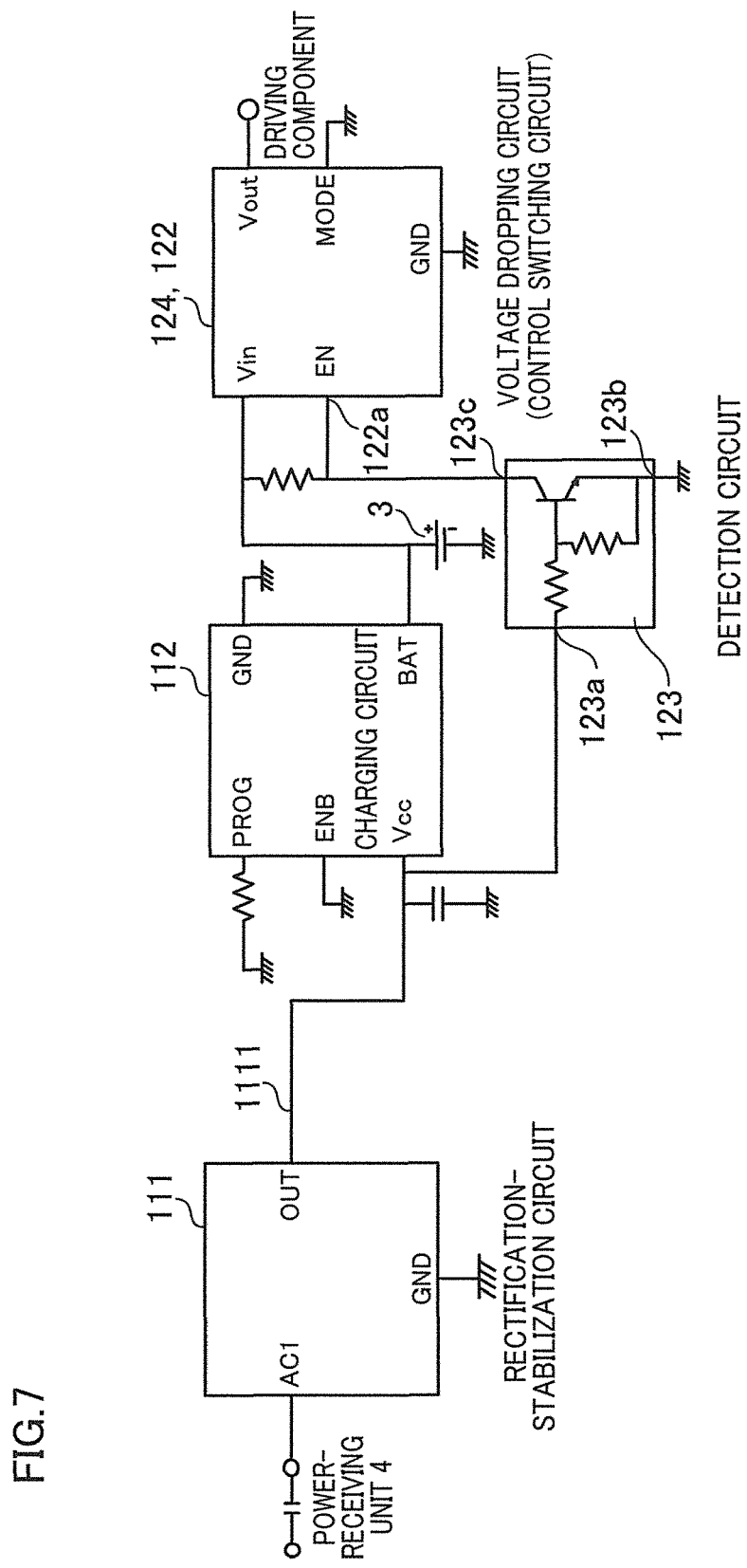
FIG. 7 is a detailed block diagram of the circuit substrate.

The rectifier 111 has a function of outputting DC power by rectifying AC power. For example, as shown in FIG. 7, a rectification-stabilization IC may be employed as the rectifier 111. The rectification-stabilization IC is an IC in which functions such as full bridge synchronous rectification, voltage conditioning and wireless power control, and protection from a voltage, current, or temperature anomaly are integrated into one chip.

The charging unit 112 has a function of supplying DC power from the rectifier 111 to the secondary battery 3 at a predetermined voltage. As the charging unit 112, an IC for constant current/constant voltage linear charger may be employed. The charging unit 112 has functions such as a function of notifying that the charging current has been reduced to a predetermined value set in advance, a function of ending charging by means of a timer, a function of stabilizing the charging current by means of thermal feedback, and a function of restricting a chip temperature when driven with large power or under a high ambient temperature.

The transformation unit 124 has a function of outputting charging power of the secondary battery 3 to the driving component 5 at a predetermined constant voltage. The transformation unit 124 includes at least one of a voltage boosting circuit increasing a voltage to be higher than the terminal voltage of the secondary battery 3 and a voltage dropping circuit decreasing a voltage to be lower than the terminal voltage of the secondary battery 3. As the voltage dropping circuit, a linear regulator may be used. As the voltage boosting circuit and the voltage dropping circuit, a switching regulator may be used. With this arrangement, the transformation unit 124 is able to employ a driving component which is driven at a voltage higher than or lower than the terminal voltage of the secondary battery 3, and hence the degree of freedom in the choice of the driving components 5 is further improved. The cost reduction for the hearing aid 6 is therefore further achieved.

(Hearing Aid 6: Circuit Substrate 1)

Figure 6:
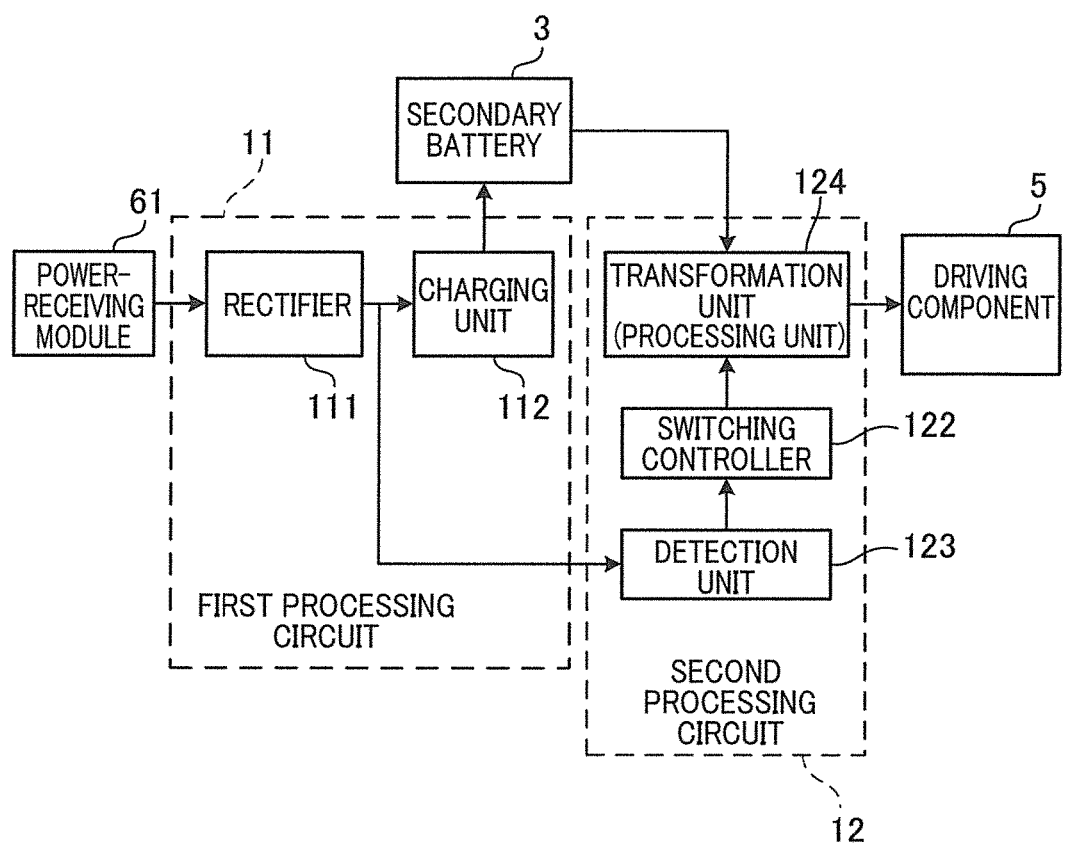
FIG. 6 is a schematic block diagram of a circuit substrate.

As shown in FIG. 5, the hearing aid 6 includes a circuit substrate 1 on which a charging/discharging circuit which realizes the functions of the rectifier 111, the charging unit 112, and the transformation unit 124 described above. The circuit substrate 1 of the present embodiment is structured so that noises generated during an operation of one processing circuit is kept from affecting an operation state of another processing circuit. That is, as shown in FIG. 6, the circuit substrate 1 includes a first processing circuit 11 and a second processing circuit 12 which is disposed at a position which may cause the first processing circuit 11 to malfunction from noises generated in accordance with signal processing, and comes to a halt state when the first processing circuit 11 operates. The expression "signal processing" herein means processing of signals such as optical signals, audio signals, electromagnetic signals, electric signals and the like, and encompasses at least one of analog signal processing and digital signal processing.

In the circuit substrate 1 having the above structure, the second processing circuit 12 comes to a halt state when the first processing circuit 11 operates. Therefore, the noises generated in association with the signal processing in the second processing circuit 12 does not cause the first processing circuit 11 to malfunction, even when the second processing circuit 12 is disposed in a position close to the first processing circuit 11. This allows the first processing circuit 11 and the second processing circuit 12 to be arranged close to each other, and allows counting out of the effects of noises between the first processing circuit 11 and the second processing circuit 12 from the design parameters, thus enabling expansion of the design flexibility of circuit arrangements.

To be more specific, the first processing circuit 11 of the circuit substrate 1 includes a power-receiving module 61 outputting AC power and a secondary battery 3 capable of charging and discharging power. The first processing circuit 11 includes a rectifier 111 and a charging unit 112. In the meanwhile, the second processing circuit 12 includes a transformation unit 124, a detection unit 123 detecting that the first processing circuit 11 is in an operating state, and a switching controller 122 switching the transformation unit 124 from the operating state to a stopped state only when the detection unit 123 detects that the first processing circuit 11 is in the operating state.

The detection unit 123 serves as a detecting circuit configured to output a detection signal indicating the first processing circuit 11 is in the operation state, based on DC power output from the rectifier 111. The detecting circuit may be formed by an analog circuit such as a transistor. To be more specific, as shown in FIG. 7, the detection unit 123 connects a base terminal 123a of a NPN transistor to an output power line 1111 between the rectifier 111 and the charging unit 112, and connects an emitter terminal 123b to the ground. Furthermore, as a collector terminal 123c is connected to the positive side of the secondary battery 3 via a resistor, a high impedance state is achieved, and connection to the collector terminal 123c to an input terminal 122a of the switching controller 122 is achieved.

As a result, when the rectifier 111 does not output DC power, the base terminal 123a of the detection unit 123 is in the low level and the emitter terminal 123b and the collector terminal 123c are not electrically connected with each other, with the result that a high-level detection signal is input to the input terminal 122a of the switching controller 122. In the meanwhile, when DC power is supplied from the rectifier 111 to the charging unit 112 via the output power line 1111, the base terminal 123a is in the high level, and hence the collector terminal 123c and the emitter terminal 123b are electrically connected with each other and the signal at the collector terminal 123c is changed to a low-level detection signal with a ground potential. As a result, the low-level detection signal is input to the input terminal 122a of the switching controller 122. The detection unit 123 may be formed by a digital circuit.

As shown in FIG. 6, the switching controller 122 is a switching control circuit which sets the transformation unit 124 to the halt state when the low-level detection signal is input, and sets the transformation unit 124 to the operation state when the high-level detection signal is input (i.e., when the low-level detection signal is not input). While in the present embodiment the low-level detection signal is a condition to stop the transformation unit 124 whereas the high-level detection signal is a condition to operate the transformation unit 124, the low-level detection signal may be a condition to start the transformation unit 124 whereas the high-level detection signal may be a condition to stop the transformation unit 124.

This way, in the circuit substrate 1 of the charging/discharging circuit, the timing of the transformation unit 124 such as a switching regulator and the like possibly generating a noise is synchronized with the timing at which the first processing circuit 11 is brought to a halt, and this enables formation of a simply structured high-density charging/discharging circuit in which the first processing circuit 11 does not malfunction due to the noise of the second processing circuit 12.

Each of the first processing circuit 11 and the second processing circuit 12 is preferably formed by an analog/digital hybrid integrated circuit in which a digital signal processing circuit and an analog signal processing circuit are integrated. This way, the design flexibility at a time of integrating the circuit substrate 1 is improved, and further downsizing and weight-reduction will be possible by forming the circuit substrate 1 as a single-chip.

(Hearing Aid 6: Control Substrate 63)

As shown in FIG. 5, the circuit substrate 1 arranged as above is mounted on the control substrate 63 together with the circuit substrate of the controller 125. The control substrate 63 is connected to the output unit 65 and the input unit 66 and has a function of outputting a control signal to the output unit 65, a function of receiving an input signal from the input unit 66, and a function of processing different types of information and data corresponding to the use of the hearing aid 6.

The control substrate 63 is provided in a magnetic field space which is formed by resonance phenomenon to have a lower magnetic field strength than those in other parts. To put it differently, the hearing aid 6 generates a space part having a small magnetic field at or around the inner side of the power-receiving module 61 when power supply using the resonance phenomenon is carried out, and this space part is used as an arrangement place of the control substrate 63. The control substrate 63 includes the circuit substrate 1 of the charging/discharging circuit and the controller 125. With this, in the hearing aid 6, the occurrence of Eddy Current due to a magnetic field at the control substrate 63 provided in the space part is restrained, and hence the occurrence of a malfunction and generation of heat equal to or higher than a predetermined temperature are prevented.

In addition to the control substrate 63, in the hearing aid 6, the secondary battery 3, the output unit 65, and the input unit 66 may also be provided in the space part (magnetic field space). To put it differently, in the hearing aid 6, at least one of the rectifier 111, the charging unit 112, the transformation unit 124, and the secondary battery 3 is provided in the magnetic field space. With this arrangement, a space part having a small magnetic field is generated in the vicinity of the power-receiving module 61 to which power is supplied by resonance phenomenon, and this space part is effectively utilized as an arrangement place for electronic circuit components such as the rectifier 111. It is therefore possible to secure the arrangement place for electronic circuit components even in the hearing aid 6 in which it is typically difficult to secure the arrangement place, and eventually to realize the downsizing of the hearing aid.

(Space Part Having Small Magnetic Field)

Now, the space part having a small magnetic field, which is mainly used as an arrangement place where the control substrate 63 is provided, will be detailed.

The hearing aid 6 is arranged such that a space part having a small magnetic field is formed at a desired position. The formation of the space part at the desired position is achieved by suitably setting power supply conditions such as a positional relation with the charging device 7, a power-supplying state, and an internal structure.

For example, the hearing aid 6 may be arranged such that, when power is supplied by the resonance phenomenon from the power-supplying resonance coil 711 of the power-supplying module 71 of the charging device 7 to the power-receiving resonance coil 611 of the power-receiving module 61, at a desired position between the power-supplying resonance coil 711 of the power-supplying module 71 and the power-receiving resonance coil 611 of the power-receiving module 61, a magnetic field space having a magnetic field strength lower than the magnetic field strengths in parts other than the desired position is formed as a space part. Because in this case the space part is generated at around the charging device 7 side of the power-receiving module 61, the leading end portion side of the outer wall member is secured as the arrangement place of the control substrate 63 as the power-receiving module 61 is disposed to be slightly closer to the rear side than the leading end portion on the charging device 7 side of the outer wall member.

An example of a method of forming the space part will be detailed. When power is supplied by the resonance phenomenon from the power-supplying resonance coil 711 of the power-supplying module 71 of the charging device 7 to the power-receiving resonance coil 611 of the power-receiving module 61 of the hearing aid 6, the frequency of the power supplied to the power-supplying resonance coil 711 of the power-supplying module 71 is arranged so that the direction of a current flowing in the power-supplying resonance coil 711 of the power-supplying module 71 is opposite to the direction of a current flowing in the power-receiving resonance coil 611 of the power-receiving module 61.

In the formation method above, when power transmission using the resonance phenomenon is performed, the coupling coefficient indicating the strength of the coupling between the power-supplying resonance coil 711 and the power-receiving resonance coil 611 is increased as the power-supplying resonance coil 711 of the power-supplying module 71 and the power-receiving resonance coil 611 of the power-receiving module 61 are disposed to be close to each other. When the coupling coefficient is high in this manner, the measurement of a transmission characteristic "S21" (which is a value used as an index of power transmission efficiency when power is supplied from the power-supplying resonance coil 711 to the power-receiving resonance coil 611) shows that a measured waveform has two separated peaks on the low frequency side and the high frequency side, respectively. As the frequency of the power supplied to the power-supplying resonance coil 711 is set at a frequency around the peak on the high frequency side, the direction of the current flowing in the power-supplying resonance coil 711 is arranged to be opposite to the direction of the current flowing in the power-receiving resonance coil 611, and hence the magnetic field generated on the inner circumference side of the power-supplying resonance coil 711 and the magnetic field generated on the inner circumference side of the power-receiving resonance coil 611 cancel each other out, with the result that an influence of the magnetic field is reduced on the inner circumference sides of the power-supplying resonance coil 711 and the power-receiving resonance coil 611. With this, a magnetic field space having a magnetic field strength lower than the magnetic field strengths in parts other than the inner circumference sides of the power-supplying resonance coil 711 and the power-receiving resonance coil 611 is formed as a space part.

In another method of forming a space part, for example, when power is supplied from the power-supplying resonance coil 711 to the power-receiving resonance coil 611 by the resonance phenomenon, the frequency of the power supplied to the power-supplying resonance coil 711 is set so that the direction of the current flowing in the power-supplying resonance coil 711 is identical with the direction of the current flowing in the power-receiving resonance coil 611.

According to the method above, when power transmission using the resonance phenomenon is performed, the coupling coefficient indicating the strength of the coupling between the power-supplying resonance coil 711 and the power-receiving resonance coil 611 is increased as the power-supplying resonance coil 711 and the power-receiving resonance coil 611 are disposed to be close to each other. When the coupling coefficient is high in this manner, the measurement of the transmission characteristic shows that a measured waveform has two separated peaks on the low frequency side and the high frequency side, respectively. As the frequency of the power supplied to the power-supplying resonance coil 711 is set at a frequency around the peak on the low frequency side, the direction of the current flowing in the power-supplying resonance coil 711 is arranged to be identical with the direction of the current flowing in the power-receiving resonance coil 611, and hence the magnetic field generated on the outer circumference side of the power-supplying resonance coil 711 and the magnetic field generated on the outer circumference side of the power-receiving resonance coil 611 cancel each other out, with the result that an influence of the magnetic field is reduced on the outer circumference sides of the power-supplying resonance coil 711 and the power-receiving resonance coil 611. With this, a magnetic field space having a magnetic field strength lower than the magnetic field strengths in parts other than the outer circumference sides of the power-supplying resonance coil 711 and the power-receiving resonance coil 611 is formed as a space part.

In addition to the above, the size of the space part may be set based on the strength of the magnetic coupling between the power-supplying resonance coil 711 and the power-receiving resonance coil 611, by changing adjustment parameters regarding the power-supplying resonance coil 711 and the power-receiving resonance coil 611. For example, the size of the magnetic field space is increased by relatively weakening the magnetic coupling between the power-supplying resonance coil 711 and the power-receiving resonance coil 611. In the meanwhile, the size of the magnetic field space is decreased by relatively strengthening the magnetic coupling between the power-supplying resonance coil 711 and the power-receiving resonance coil 611. As such, a space part optimum for the size of the hearing aid 6 is formed.

Alternatively, the size of the magnetic field space may be changed in such a way that the arrangement relation of the power-supplying resonance coil 711 and the arrangement relation of the power-receiving resonance coil 611 are used as the adjustment parameters, and the adjustment parameters are changed to change the strength of the magnetic coupling between the power-supplying resonance coil 711 and the power-receiving resonance coil 611.

Furthermore, the shape of the space part may be arranged to be a desired shape in such a way that the shapes of the power-supplying resonance coil 711 and the power-receiving resonance coil 611 are used as the adjustment parameters, and the shapes of these coils are changed in a desirable manner to change the strength of the magnetic coupling between and around the power-supplying resonance coil 711 and the power-receiving resonance coil 611. In this case, as the power-supplying resonance coil 711 and the power-receiving resonance coil 611 are arranged to have desired shapes, a magnetic field space having a relatively low magnetic field strength is formed with a desired shape corresponding to the shapes of the coils.

In addition to the above, the size of the space part may be set in such a way that at least one of the first distance between the power-supplying resonance coil 711 and the power supply coil 712 and the second distance between the power-taking coil 612 and the power-receiving resonance coil 611 is used as an adjustment parameter, and the size is set based on this adjustment parameter. For example, the size of the magnetic field space is increased in such a way that the first distance between the power-supplying resonance coil 711 and the power supply coil 712 and the second distance between the power-taking coil 612 and the power-receiving resonance coil 611 are relatively shortened so that the magnetic coupling is relatively weakened. In the meanwhile, the size of the magnetic field space is decreased in such a way that the first distance between the power-supplying resonance coil 711 and the power supply coil 712 and the second distance between the power-taking coil 612 and the power-receiving resonance coil 611 are relatively elongated so that the magnetic coupling is relatively strengthened.

In addition to the above, as a space part, a magnetic field space may be formed at a desired position with a magnetic field strength lower than the magnetic field strengths in parts other than the desired position, in such a manner that, a magnetic member is provided to cover at least a part of the power-receiving resonance coil 611 and the power-supplying resonance coil 711 except the surfaces where these coils oppose each other, and power transmission is carried out by changing the magnetic field between the power-supplying resonance coil 711 and the power-receiving resonance coil 611. The magnetic member may be provided to cover the inner circumferential surface of the power-receiving resonance coil 611. In this case, by blocking the magnetic field generated on the inner circumference side of the power-receiving resonance coil 611, a magnetic field space having a relatively low magnetic field strength is formed as a space part on the inner circumference side of the power-receiving resonance coil 611.

In addition to the above, the magnetic member may be provided to cover the surfaces of the power-supplying resonance coil 711 and the power-receiving resonance coil 611, which surfaces are opposite to the surfaces where the coils oppose each other. In this case, by blocking the magnetic field generated at around the surface opposite to the opposing surface of the power-receiving resonance coil 611, a magnetic field space having a relatively low magnetic field strength is formed as a space part at around the surface opposite to the opposing surface of the power-receiving resonance coil 611.

As such, the hearing aid 6 is arranged such that, based on a combination of at least one of the above-described methods of forming the space part, a magnetic field space having a low magnetic field strength can be intentionally formed at will as a space part at and around the inner side of the power-receiving module 61, and the size and shape of the space part can be arbitrarily set. To put it differently, in the hearing aid 6, a desired space part is formed by adjusting the way of disposing the power-receiving module 61.

(Hearing Aid Charging System 8 and Charging Device 7)

Figure 10:
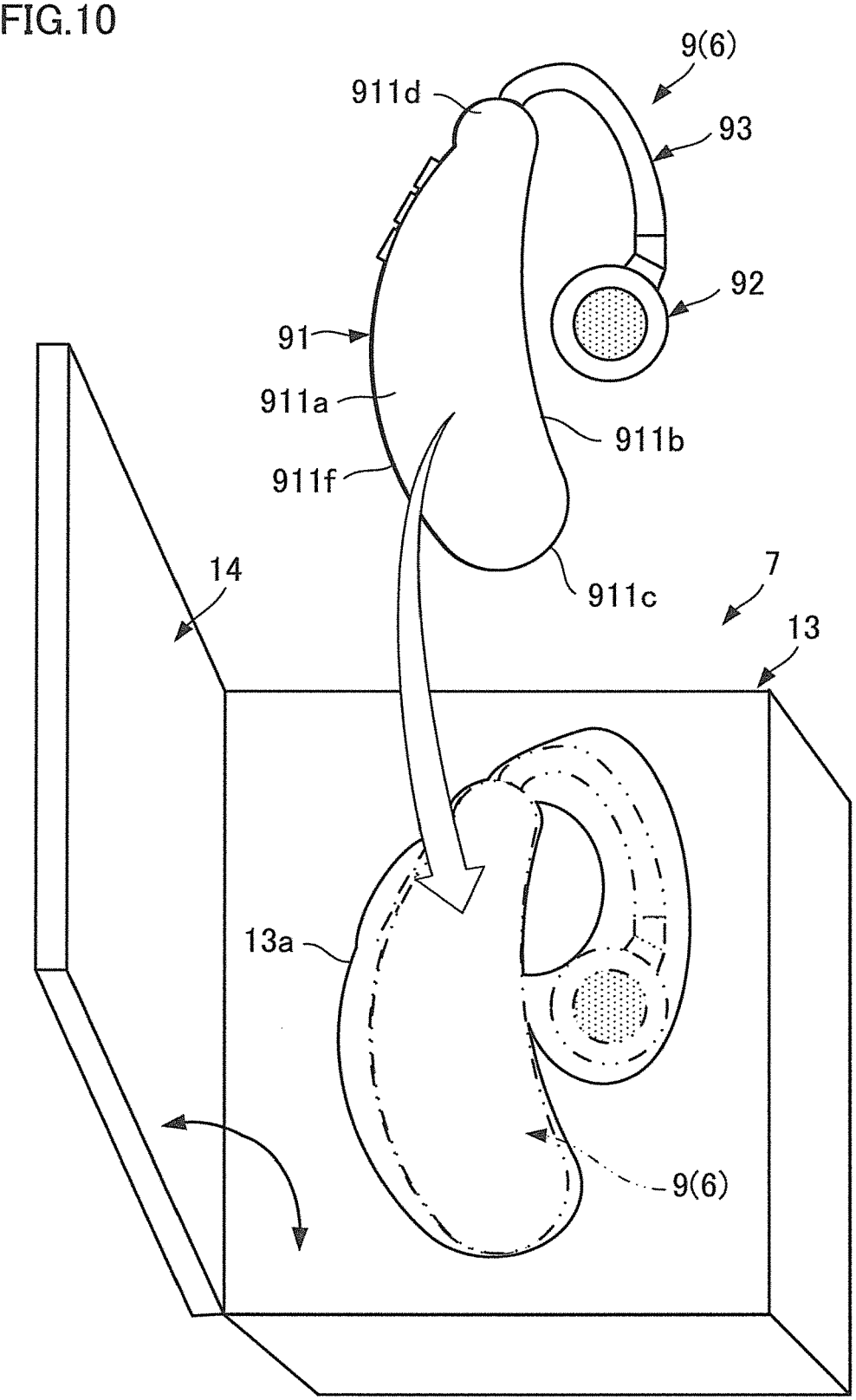
FIG. 10 illustrates a state in which a hearing aid is housed in a charging device.

As shown in FIG. 5, the hearing aid 6 is charged by a hearing aid charging system 8. The hearing aid charging system 8 includes the hearing aid 6 and a charging device 7 for charging the secondary battery 3 of the hearing aid 6. The charging device 7 includes, for example, as shown in FIG. 10, a supporting stand 13 which detachably supports an ear-hook hearing aid 9 which are a type of the hearing aid 6, in a predetermined power supplying posture. To be more specific, the supporting stand 13 is provided with a concave portion 13a which is able to house the ear-hook hearing aid 9. The concave portion 13a is formed to position the ear-hook hearing aid 9 in horizontal directions and height directions (up-down directions). The positioning in the height directions is carried out in such a way that, when the ear-hook hearing aid 9 is placed in the concave portion 13a, the lower surface of the ear-hook hearing aid 9 makes contact with the concave portion 13a on account of gravitation. With this arrangement, in the hearing aid charging system 8, when the ear-hook hearing aid 9 is placed in the concave portion 13a of the supporting stand 13, the ear-hook hearing aid 9 is retained in the horizontal and height directions by the concave portion 13a, with the result that the distance and the positional relation between the power-receiving module 61 of the ear-hook hearing aid 9 and the power-supplying module 71 of the charging device 7 are maintained to be constant and the ear-hook hearing aid 9 is charged with a voltage suitable for the charging characteristic of the secondary battery 3. The shape of the concave portion 13a of the supporting stand 13 is described as an example when the ear-hook hearing aid 9 is provided therein, and the shape of the concave portion 13a varies in accordance with the type and size of the hearing aid 6.

The power-supplying module 71 of the charging device 7 is provided with a power-supplying resonance coil 711 and a power supply coil 712 each of which is made of a copper wire material coated by an insulation film. Examples of the types of coils used as the power-supplying resonance coil 711 and the power supply coil 712 include a spiral type, a solenoid type, and a loop type. Furthermore, the charging device 7 is provided with an oscillator 72 supplying AC power to the power-supplying module 71. Furthermore, the charging device 7 includes a hearing aid detector 74 detecting the hearing aid 6 (ear-hook hearing aid 9) supported by the supporting stand 13 and a power-supplying module controller 73 driving the power-supplying module 71 only when the hearing aid detector 74 detects the hearing aid 6. As the hearing aid detector 74, a contactless sensor such as an optical or magnetic sensor or a contact sensor which is turned on/off when making contact with the hearing aid 6 is employed. With this arrangement, the charging device 7 is able to perform charging with a voltage suitable for the charging characteristic of the secondary battery 3.

In addition to the above, the charging device 7 includes a cover member 14 which is able to cover an exposed part (upper surface side) of the hearing aid 6 supported by the supporting stand 13. The cover member 14 is provided to be able to cover or uncover the upper surface of the supporting stand 13. The cover member 14 is provided with a power-supplying module 71 supplying power by resonance phenomenon to the power-receiving module 61 of the hearing aid 6 supported by the supporting stand 13. The power-supplying module 71 is disposed to oppose the power-receiving module 61 of the hearing aid 6 when the cover member 14 covers the exposed part of the hearing aid 6. With this arrangement, charging is performed only when the hearing aid 6 is covered by the cover member 14. On this account, whether the charging is in progress or is stopped can be confirmed by checking whether the hearing aid 6 is covered by the cover member 14. In other words, in the charging device 7, whether the charging is in progress or is stopped is easily discerned by the state of opening/closing of the cover member 14.

The power-supplying module 71 may be provided in the supporting stand 13. In a manner similar to the hearing aid 6, the charging device 7 may be arranged such that a space part having a small magnetic field is generated at or around the inner side of the power-supplying module 71 at the time of power supply by the resonance phenomenon, and this space part is used as an arrangement place for the oscillator 72 and the power-supplying module controller 73. This arrangement makes it possible to downsize the charging device 7 in addition to the hearing aid 6.

(Specific Example of Hearing Aid 6)

Now, the following will detail a case where the hearing aid 6 arranged as above is employed as an ear-hook hearing aid 9.

Figure 8:
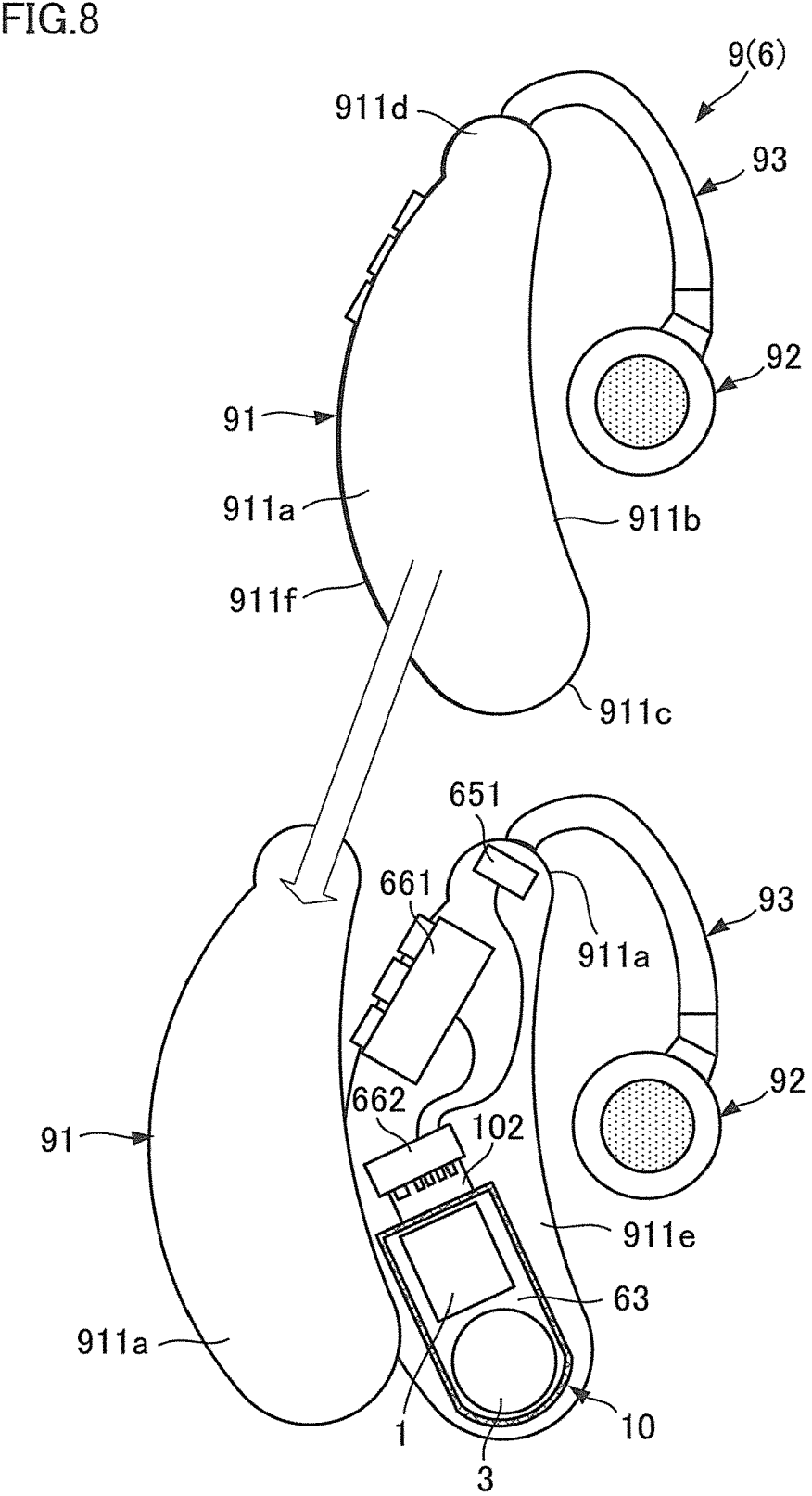
FIG. 8 is an explanatory diagram of a schematic structure of an ear-hook hearing aid.

As shown in FIG. 8, the ear-hook hearing aid 9 includes a hearing aid main body 91 attached to the auricle, an ear mold 92 arranged to make contact with the opening of the ear hole or its surroundings, a connecting portion 93 connecting the hearing aid main body 91 with the ear mold 92, a control substrate 63 including a circuit substrate 1 of a charging/discharging circuit and a controller 125, and an output unit 65 and an input unit 66 which are connected to the control substrate 63. The output unit 65 is constituted by a member such as a speaker 651 configured to output sound. The input unit 66 is constituted by members such as an operation button 661 for controlling sound volume and switching of the power source and a sound concentrating microphone configured to convert outside sound into an electric sound signal.

The hearing aid main body 91 has a hexahedral housing (outer wall member) which is curved from the top part to the bottom part to extend along the root of the auricle. That is to say, the housing of the hearing aid main body 91 includes an upper surface part 911*d* at the top part, a bottom surface part 911*c* at the bottom part, a head-contacting surface part 911*a* in contact with the head, an auricle-contacting part 911*e* arranged to oppose the head-contacting surface part 911*a* and in contact with the auricle, an inner contacting surface part 911*b* surface-contacting with the root of the auricle along the same, and an outer surface part 911*f* arranged to oppose the inner contacting surface part 911*b*. The hearing aid main body 91 is structured to be dividable in two, i.e., into the head-contacting surface part 911*a* and the auricle-contacting part 911*e*. As such, the head-contacting surface part 911*a* functions as a lid whereas the auricle-contacting part 911*e* functions as a container.

To the upper surface part 911*d* of the hearing aid main body 91, one end portion of the connecting portion 93 is connected. The connecting portion 93 is a hollow tube in shape. The other end portion of the connecting portion 93 is connected to the ear mold 92. With this arrangement, the ear-hook hearing aid 9 outputs sound collected and amplified by the hearing aid main body 91 from the speaker 651 to the ear mold 92 via the connecting portion 93, and allows the user of the ear-hook hearing aid 9 to receive the sound in a clear manner.

(Hearing Aid 6: Ear-Hook Hearing Aid 9: Module Component 10)

The ear-hook hearing aid 9 arranged as above include a module component 10 which is detachable and provided at a predetermined position. The module component 10 has a power receiving function of receiving power by the resonance phenomenon, a secondary battery function of being chargeable and dischargeable, a charging and discharging function of charging and discharging the secondary battery 3, and a control function of controlling the components of the ear-hook hearing aid 9.

Figure 9A:
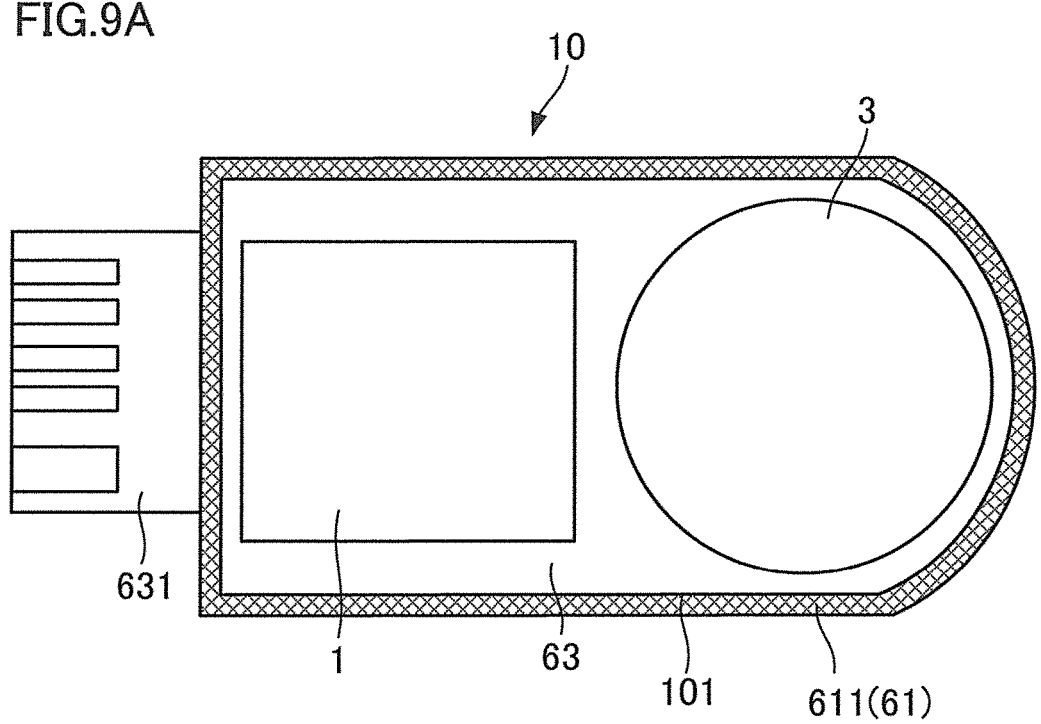
FIG. 9A is a plan view of a module component.
Figure 9B:
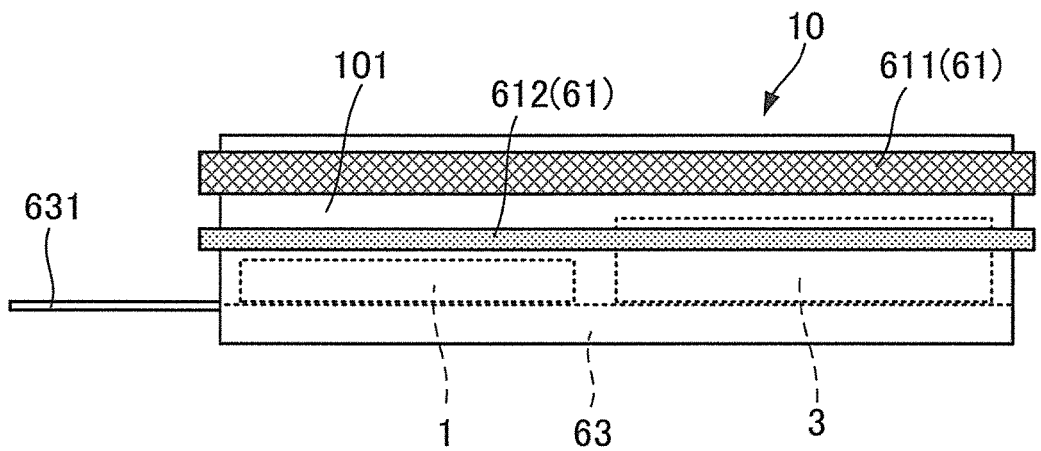
FIG. 9B is a front elevation of the module component.

As shown in FIG. 9A and FIG. 9B, the module component 10 includes a control substrate 63 which is a flat plate in shape and a circuit substrate 1 and a secondary battery 3 both provided on the upper surface of the control substrate 63. The circuit substrate 1 may be formed as a part of the control substrate 63. The circuit substrate 1 includes the above-described rectifier 111 and the like and a controller 125. Around the control substrate 63, a wall member 101 is provided. The wall member 101 is made of a conductive material such as metal. On the outer circumferential surface of the wall member 101, a power-receiving resonance coil 611 and a power-taking coil 612 are provided. The power-receiving resonance coil 611 and the power-taking coil 612 are made of a copper wire material coated by an insulation film.

As such, because the wall member 101 functioning as a magnetic member is provided to cover the inner circumferential surfaces of the power-receiving resonance coil 611 and the power-taking coil 612, the circuit substrate 1 provided on the inner circumference sides of the power-receiving resonance coil 611 and the power-taking coil 612 is provided in a magnetic field space having a relatively low magnetic field strength. As a result, the circuit substrate 1 provided on the control substrate 63 is less influenced by a magnetic field when the power-receiving module 61 receives power.

In addition to the above, the inner circumference side of the wall member 101 is filled with solidified resin to cover the circuit substrate 1 and the ear-hook hearing aid 9. With this, in the module component 10, the circuit substrate 1 and the secondary battery 3 are less likely to be damaged by collision or water leakage.

From an end face of the control substrate 63, a terminal portion 631 protrudes. The terminal portion 631 is connected to the controller 125, and includes a control signal terminal, a GND terminal, a power source terminal, or the like. The terminal portion 631 functions as a male connector, and a female connector 662 is detachably attached thereto. The female connector 662 is connected with an output unit 651 such as a speaker and an input unit 661.

With the module component 10 arranged as above, an operation to manufacture or repair the ear-hook hearing aid 9 can be completed by detaching and attaching each module component 10, and hence the manufacturing and repairing the ear-hook hearing aid 9 can be easily done in a short time. Furthermore, as the size, shape, and the terminal portion 631 of each module component 10 is standardized, portable devices including not only the ear-hook hearing aid 9 but also various types of the hearing aid 6 can share the same module component 10.

While in the present embodiment the wall member 101 functioning as a magnetic member covers the circumference of the control substrate 63, the lower surface of the module component 10 (lower surface of the control substrate 63) may be further covered with a magnetic member or the top surface of the module component 10 may be further covered with a magnetic member. In such a case, each driving component on the control substrate 63 is arranged in a magnetic field space having a lower magnetic field strength.

In the detailed description provided above, characteristic parts have mainly been described in order that the present invention can be understood more easily. However, the present invention is not limited to the embodiment shown in the detailed description provided above, and may be applied to other embodiments. The scope of application of the present invention should be construed as Broadly as possible. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. Accordingly, it should be considered that claims cover equivalent structures, too, without departing from the technical idea of the present invention. In addition, it is desirable to sufficiently refer to already-disclosed documents and the like, in order to fully understand the objects and effects of the present invention.

REFERENCE SIGNS LIST

1 CIRCUIT SUBSTRATE
3 SECONDARY BATTERY
5 DRIVING COMPONENT
6 HEARING AID
7 CHARGING DEVICE
8 CHARGING SYSTEM
9 EAR-HOOK HEARING AID
10 MODULE COMPONENT
11 FIRST PROCESSING CIRCUIT
12 SECOND PROCESSING CIRCUIT
13 SUPPORTING STAND
14 COVER MEMBER
61 POWER-RECEIVING MODULE
71 POWER-SUPPLYING MODULE

The invention claimed is:
1. A hearing aid comprising:
a secondary battery having a nominal voltage higher than a nominal voltage of an air battery;
at least one driving component driven by power supplied from the secondary battery;
a charging unit configured to supply DC power at a predetermined voltage to the secondary battery;
a transformation unit configured to output a charging power of the secondary battery to the at least one driving component, at a voltage suitable for driving the at least one driving component;
a power-receiving module configured to receive resonance-type power from the outside in a contactless manner; and
a rectifier configured to output DC power to the charging unit by rectifying the resonance-type power supplied to the power-receiving module, at least one of the rectifier, the charging unit, the transformation unit, and the secondary battery being provided in a magnetic field space that is formed by a resonance phenomenon in the power-receiving module to have a lowest magnetic field strength than a magnetic field strength in any other part of the hearing aid.

2. The hearing aid according to claim 1, wherein, the secondary battery is a lithium ion battery.

3. The hearing aid according to claim 1, wherein, the hearing aid includes two or more of the driving components driven by power at a same voltage, and
the transformation unit outputs the power at a voltage suitable for each of the driving components driven at the same voltage to each of the driving components driven at the same voltage.

4. The hearing aid according to claim 1, wherein, the hearing aid includes two or more of the driving components driven by power at different voltages, and
the transformation unit outputs the power at a voltage suitable for each of the driving components driven at different voltages to each of the driving components driven at different voltages.

5. The hearing aid according to claim 1, wherein, the transformation unit includes at least one of a voltage boosting circuit configured to increase a voltage to be higher than a terminal voltage of the secondary battery and a voltage dropping circuit configured to decrease a voltage to be lower than the terminal voltage of the secondary battery.

6. The hearing aid according to claim 1, wherein, at least one of the driving components is a dedicated member driven at the nominal voltage of the secondary battery.

7. A hearing aid charging system comprising:
the hearing aid of claim 1; and
a charging device configured to charge the secondary battery of the hearing aid,
the charging device including:
a supporting stand configured to detachably support the hearing aid in a predetermined power supplying posture; and
a power-supplying module configured to supply power in a contactless manner to the power-receiving module of the hearing aid supported by the supporting stand.

8. The hearing aid charging system according to claim 7, wherein, the charging device includes:
a hearing aid detector configured to detect the hearing aid supported by the supporting stand; and
a power-supplying module controller configured to drive the power-supplying module only when the hearing aid is detected by the hearing aid detector.

9. The hearing aid charging system according to claim 7, wherein, the charging device further includes
a cover member capable of covering an exposed part of the hearing aid supported by the supporting stand, the cover member is provided with the power-supplying module, and the power-supplying module is disposed to oppose the power-receiving module of the hearing aid when the exposed part of the hearing aid is covered by the cover member.

* * * * *